Inventor
JOSEPH G. MCDONOUGH

Patented June 14, 1932

1,863,229

UNITED STATES PATENT OFFICE

JOSEPH G. McDONOUGH, OF NEW ORLEANS, LOUISIANA; LOUISE ALLGEYER McDONOUGH ADMINISTRATRIX OF SAID JOSEPH G. McDONOUGH, DECEASED

LUMBER GRADE MARKING MACHINE

Application filed March 29, 1928. Serial No. 265,625.

This invention relates to new and useful improvements in lumber grade marking machines, and an object of the invention is to provide such a machine of comparatively simple and inexpensive construction, and which is adapted to be positioned to receive lumber from a feeding mechanism such, for example, as a planer, whereby each piece of lumber, as it is fed from the planer through the marking machine, will receive a grade mark or trade mark.

A further object of the invention is to provide a grade marking machine comprising a frame having a die member movably mounted therein and normally positioned in the path of the lumber, so that each piece of lumber, as it is fed through the machine, will engage the die member to receive a grade mark, and the die carrier being mounted in such a manner that when the piece of lumber is thrust against the die member, the latter will be moved to a position out of the path of the lumber, to permit the lumber to pass thereby uninterruptedly, after which the die member and its carrier will return to their normal positions to be engaged by the next following piece of lumber.

A further object of the invention is to provide a grade marking machine comprising a frame having means for securing it to the discharge end of a planer, and which comprises a pivotally mounted die member normally positioned in the path of the lumber and supported in a carrier movably supported in the machine frame, and the carrier having means for inking the die member each time a piece of lumber is passed through the marking machine, whereby each piece of lumber will receive an impression as it impacts with the die member.

Other objects of the invention reside in the general construction of the marking machine frame, including its pivotal mounting upon the end of the planer so that the frame is adapted for an up and down movement to make allowances for irregularities in the lumber as it is fed through the machine from the planer; in the novel manner of yieldingly supporting the die member supporting means, whereby when the forward end of a board has engaged the die member and moved the die member supporting means out of the path of the board, the tail end of the board will be moved out of abutting engagement with the next following board in time to allow the die member to be returned to its normal position to be engaged by the next following board; in the means provided for actuating the die member to move it into engagement with an inking member, each time the die member is engaged by a board; in the novel mounting of the dies in their supporting means, whereby they are adapted for rocking movement to allow for irregularities in the end of the board; and, in the pivotal mounting of the die member supporting means upon a substantially vertical axis, whereby the die member may be oscillated on a horizontal plane to mark the end of a board which may be cut on an angle or the bias; in the novel mounting of the die member supporting means which permits movement of the die member in the direction of travel of the board, simultaneously as it is moved upwardly out of the path of the board; and, in the means for returning the die member and its supporting means to their normal positions in the path of the lumber.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the accompanying drawings forming part of this specification.

Figures 1, 3:
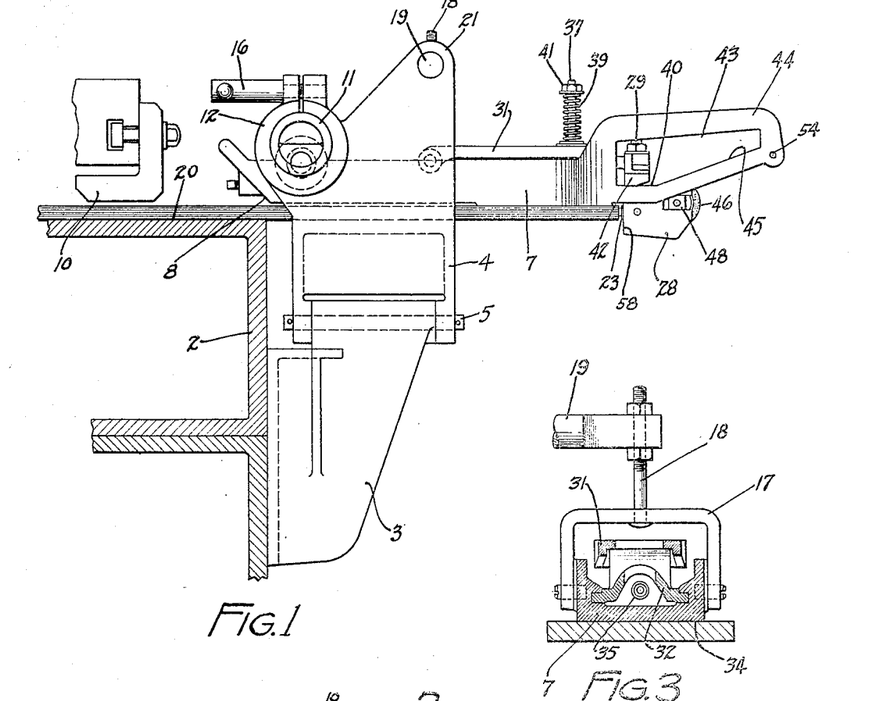
Figure 1 is a view in side elevation of my improved lumber grade marking machine, showing it attached to the discharge end of a planer.
Figure 3 is a cross sectional view on the line 3—3 of Figure 2.
Figure 7:
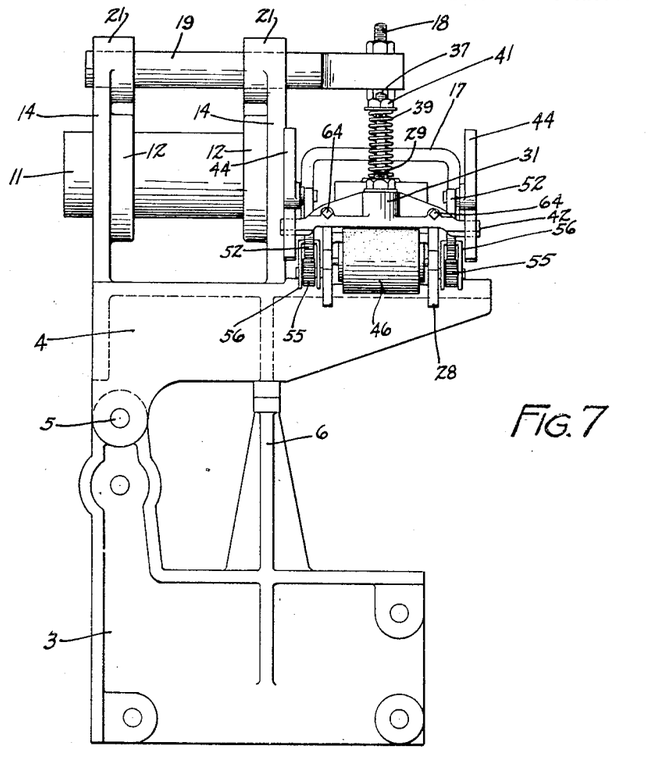
Figure 7 is an end view of the marking machine.

In the accompanying drawings, Figure 1, I have shown my improved lumber grade marking machine secured to the discharge end of an ordinary planer 2, only partially shown. The marking machine is supported upon a bracket 3, demountably secured to the planer 2, and which has a bracket 4 pivotally connected thereto by a suitable pin 5. The bracket 4 overhangs the bracket 3 and is retained in operative position by means of a post 6, preferably integrally formed with the bracket 3 as shown in Figure 7.

Figure 2:
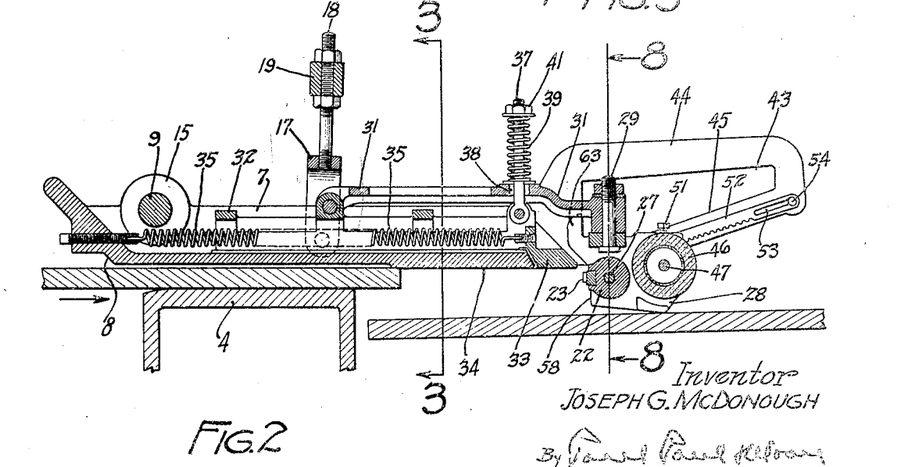
Figure 2 is a longitudinal sectional view on the line 2—2 of Figure 6, showing the die member positioned to be engaged by the lumber.
Figures 5, 6:
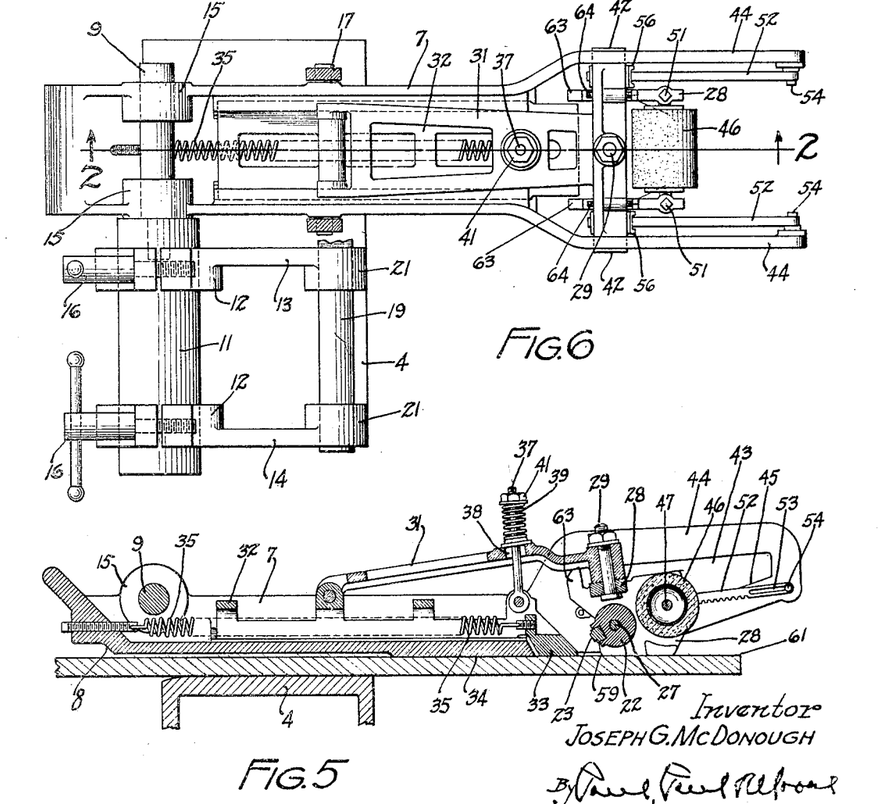
Figure 5 is a view similar to Figure 4, showing the die member and its supporting means retracted and exerting a downward pressure upon the board to move it out of the path of the next following board.
Figure 6 is a plan view of Figure 1.

The marking machine comprises a substantially horizontal frame 7, of channeled cross section, as shown in Figure 3. This frame is provided at its receiving end with a beveled face 8 to guide the lumber beneath the bottom wall of the frame 7, as shown in Figures 1 and 2. A guide 10 is provided upon the planer to guide the lumber into the marking machine. (See Figure 1.) The frame 7 is adjustably supported upon the bracket 4 by means of a pin 9 eccentrically mounted in one end of a tubular member or eccentric 11, mounted in split bearings 12 provided in standards 13 and 14 provided upon the bracket 4, as shown in Figures 6 and 7. The side walls of the channel-shaped frame 7 are provided with apertured bosses 15 adapted to receive the pin 9. Suitable clamping screws 16 provide means for securing the eccentric 11 in adjusted positions in the bearings 12.

The frame 7 is further supported by means of a yoke 17 having its lower ends pivotally connected with the side walls of the frame 7 as shown in Figure 3. A threaded stem 18 has one end secured to the yoke 17 and its upper end adjustably mounted in one end of a rod 19, pivotally mounted in bearings 21 provided in the standards 13 and 14. (See Figures 6 and 7.) By thus supporting the channel-shaped frame 7, it will be noted that the bottom face of the frame may be vertically adjusted with respect to the top face 20 of the planer, so that the marking apparatus may be relatively positioned with respect to the planer for grade marking lumber of different thicknesses.

Figure 4:
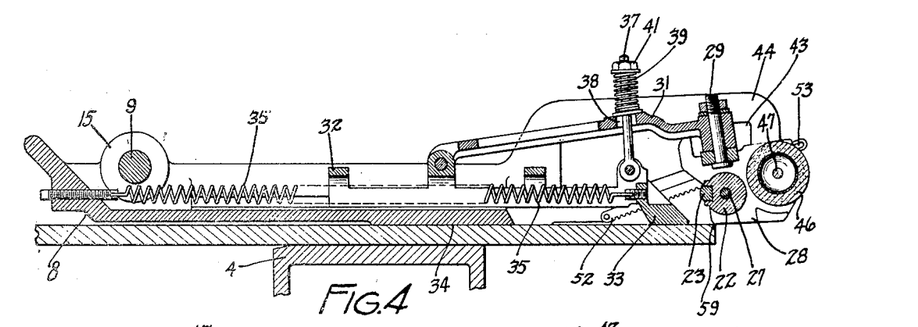
Figure 4 is a view similar to Figure 2, showing the position of the die member after having been moved out of the path of the lumber.
Figures 14, 16, 17:
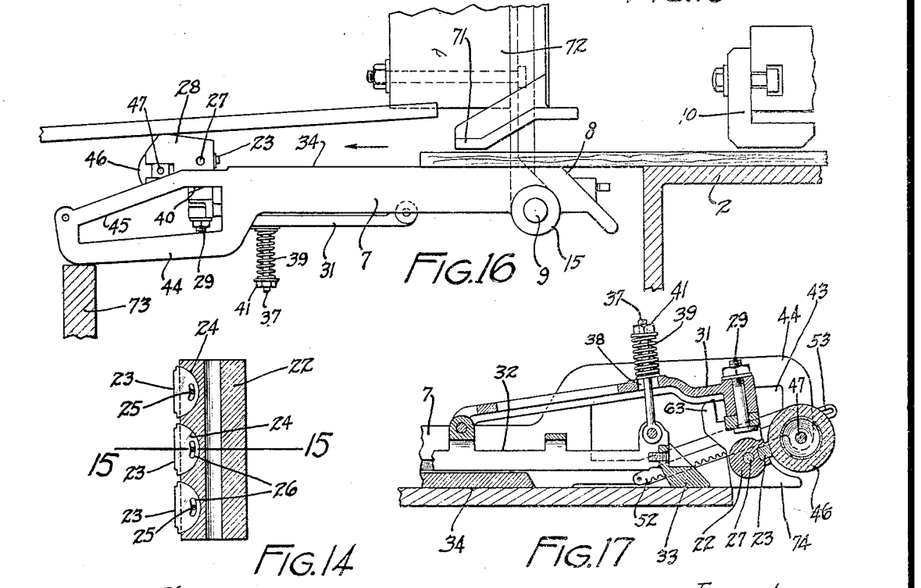
Figure 14 is a view illustrating the die roller removed from the machine and showing the means provided for movably retaining the dies therein.
Figure 16 is a view showing a modified construction wherein the structure shown in Figure 4 has been inverted.
Figure 17 is a modified construction showing the inking roll mounted on a relatively fixed frame.
Figure 15:
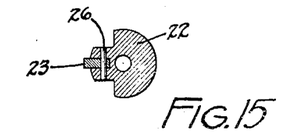
Figure 15 is a cross sectional view on the line 15—15 of Figure 14.

The lumber marking means comprises a die holder 22 having a plurality of dies 23, preferably mounted in longitudinal alinement in the periphery thereof. These dies are mounted for movement in concaved slots 24 and are retained therein by suitable pins 25. Each pin 25 traverses a slot 26 provided in its complementary die, as shown in Figures 14 and 15. The dies 23 may readily be removed from the holder 22 by removal of the pins 25. The die holder 22 is secured to a shaft 27 rotatably mounted in a die-holder supporting member or carrier 28, pivotally mounted upon a pivot pin 29 suitably supported in one end of a substantially T-shaped arm 31, having its opposite end pivotally connected with an auxiliary frame 32, slidably mounted in grooves provided in the channel-shaped frame 7, as shown in Figure 3. The slidable frame 32 has a lumber-engaging end portion 33, the lower face of which is alined with the bottom face 34 of the channel-shaped frame 7, as shown in Figures 2, 4, and 5. A suitable spring 35 normally holds the slidable frame 32 in the position shown in Figures 2 and 5.

Figure 9:
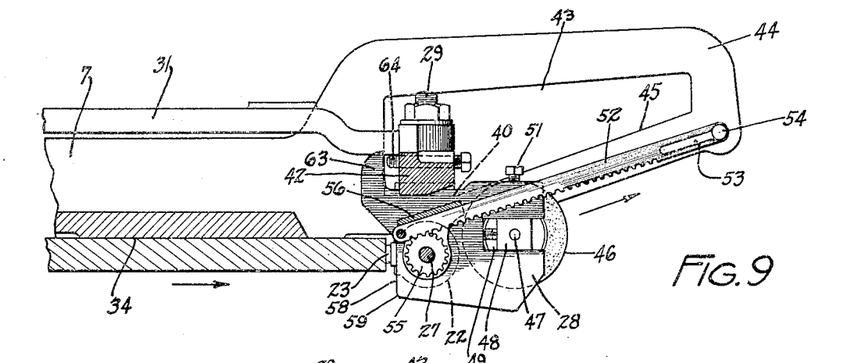
Figure 9 is an enlarged detailed sectional view on the line 9—9 of Figure 8, showing the normal position of the die member and its supporting means, and the means provided for relatively rotating the die holder to move it into inking engagement with the inking roll.

An eye bolt 37 has one end pivotally connected with the slidable frame 32 adjacent the end portion 33, and extends upwardly through an aperture 38 provided in the arm 31, as shown in Figure 2. A suitable compression spring 39 is coiled about the eye bolt 37 and is interposed between the arm 31 and a nut and washer 41, adjustably secured to the upper end of the eye bolt, whereby the tension of the spring 39 may be varied. The spring 39 constantly urges the arm 31 downwardly in a direction towards the lumber. In Figures 1, 2, and 9, the parts are shown in normal positions wherein it will be seen that the dies 23 will be substantially alined with the medial plane of the board to be marked, so that, as the board is fed in the direction indicated by the arrow in Figure 2, the end thereof will engage the dies to receive a mark.

The arm 31 is provided with lateral extensions 42 which project through openings 43 provided in spaced legs 44, integrally formed with the channel frame 7, as shown in Figures 1 and 6. The legs 44 each have a cam face 45 adapted to be engaged by the lateral extensions 42, when the die carrier is moved forwardly, as when the dies are engaged by the lumber. (See Figures 10 and 11.) Thus, it will be seen that when the dies are engaged by the end of a piece of lumber, as shown in Figures 1 and 2, the dies, die holder 22 and the die carrier will be moved forwardly in the direction of travel of the board and, as the extensions 42 engage the cam faces 45, the carrier 28 will simultaneously be moved upwardly out of the path of the end of the lumber, as shown in Figure 4. The spring 35 will then return the slidable frame 31 to its normal position, shown in Figure 5, the die carrier 28 riding upon the top surface of the board as shown. When the carrier 28 is thus positioned on top of the board, the spring 39 will be under considerable tension and tends to urge the carrier 28 downwardly from the position shown in Figure 5, to that shown in Figure 2, so that when the tail end of the board leaves the bracket 4, as shown in Figure 5, the marked board will be forced downwardly by the carrier 28 as shown in Figure 2. The engagement of the lateral extensions 42 with the substantially horizontal faces 40, will limit the downward movement of the carrier 28 so that the dies 23 will be positioned in alinement with the oncoming board as shown.

Means are provided for inking the dies 23, each time a piece of lumber has impacted therewith. Such means comprises an inking roll 46, shown in Figures 2, 4, 5, and 7, and mounted upon a small shaft 47 having its end supported in blocks 48, adjustably mounted in recesses 49 provided in the die carrier 28.

Figures 12, 13:
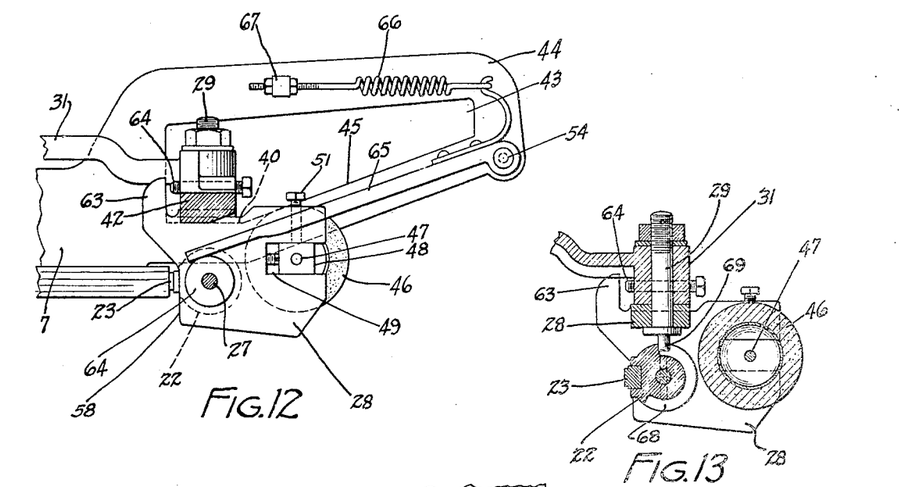
Figure 12 is a view illustrating a modified construction wherein friction means are provided for relatively rotating the die holder to move the dies into inking engagement with the inking roller.
Figure 13 is a detailed sectional view illustrating the means provided for limiting the return movement of the die roller so that the dies will be alined with the approaching board.

The blocks 48 are retained in adjusted positions by suitable lock screws 51, shown in Figure 12. The blocks 48 and lock screws 51 thus provide means for relatively adjusting the position of the inking roll 46 with respect to the die holder 22.

Figure 8:
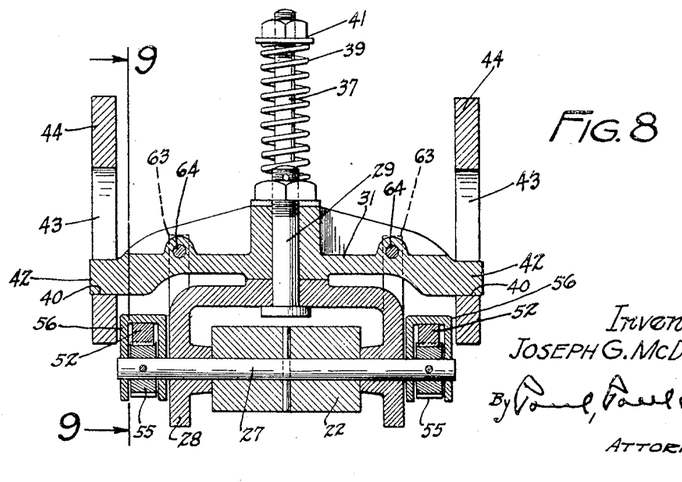
Figure 8 is an enlarged detailed sectional view on the line 8—8 of Figure 2.
Figure 10:
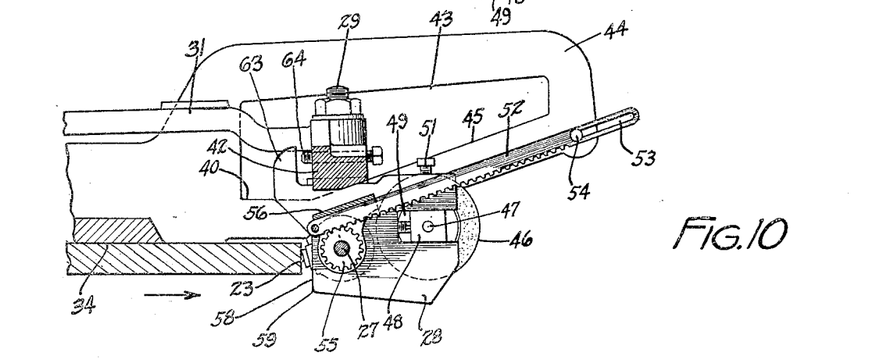
Figure 10 is a view similar to Figure 9, illustrating the die member and its supporting means after having been engaged by a board.
Figure 11:
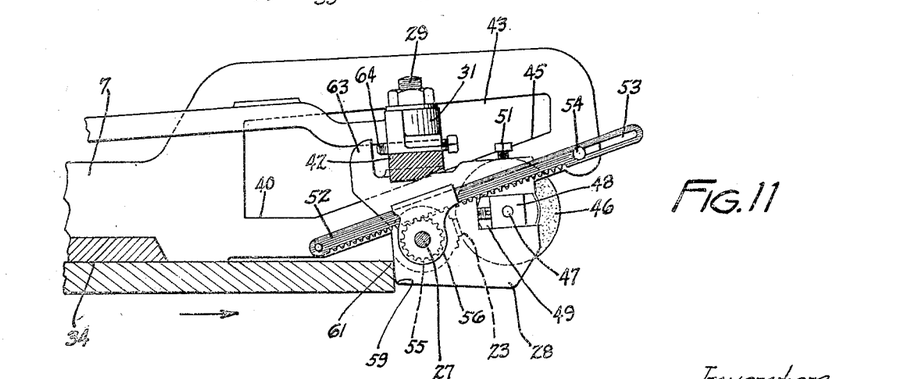
Figure 11 is another view similar to Figure 9, illustrating the die member positioned to engage the inking roll, and also illustrating the means provided for moving the die member supporting means out of the path of the lumber during its engagement with the end of the lumber.

Means are provided for partially rotating the die holder 22 to move the dies into inking engagement with the inking roll 46 each time the mechanism is actuated by a piece of lumber. Such means is best shown in Figures 9, 10, and 11, and comprises a pair of rack bars 52, each having a slot 53 at one end engaged with a pin 54. These pins are terminally mounted in the legs 44 of the channel-shaped frame 7, shown in Figure 6. The opposite ends of the rack bars are engaged with pinions 55 secured to the shaft 27, as shown in Figure 8. The lower ends of the rack bars are slidably supported in guides 56 mounted upon the shaft 27. Referring to Figure 1, it will be noted that the lateral extensions 42 of the T-shaped arm 32, are normally supported upon the substantially horizontal surfaces 40. Thus, it will be seen that the extensions 42, when initially moved in the direction of travel of the board, as a result of the board engaging the dies, will travel in a line substantially parallel to the line of travel of the board until they engage the cam faces 45, after which they will begin to move upwardly. During the initial movement of the extensions 42 upon the horizontal surfaces 40, the rack bars 52 will be longitudinally moved with respect to the frame 7, because of the slots 53. As soon, however, as the opposite ends of the slots engage the pins 54, further longitudinal movement of the rack bars will be interrupted, thereby causing the pinions 55 to roll in the rack bars 52, with the resultant rotation of the die holder 22 until the dies are moved into inking engagement with the periphery of the inking roll 46 as shown in Figure 11.

Figures 1, 2, and 9 illustrate the marking mechanism in normal position, and it will be noted by reference to Figures 1 and 9, that when the marking mechanism is thus positioned, the lateral extensions 42 of the arm 31 will be positioned upon the horizontal surfaces 40 of the legs 44 of the channel frame 7.

Figure 10 illustrates the position of the parts just after the lateral extensions 42 have engaged the cam faces 45. In this figure, it will also be noted that the pins 54 are engaged with the opposite ends of the slots 53, provided in the rack bars 52, so that further movement of the die carrier 28 in a forward and upward direction will cause the pinions 55 to roll in the rack bars 52 to rotate the die holder 22, as previously described. As the board continues forwardly, the dies are moved out of engagement with the end of the board, and the latter will engage the substantially vertical faces 58 of the carrier 28, until the latter has been elevated to the position shown in Figure 4. When the corners 59 of the carrier 28 slide over the upper corner 61 of the board, as shown in Figure 4, the carrier 28 and its associated parts will be returned to the position shown in Figure 5, by the action of the spring 35. During the upward movement of the die carrier 28, the spring 39 will be put under considerable tension because of the upward movement of the arm 31, so that when the carrier 28 is positioned as shown in Figure 5, a downward pressure will be exerted against the upper surface of the board, tending to force it downwardly.

When the tail end of the marked board moves out of engagement with the bracket 4, the board will be forced downwardly as shown in Figure 2, by the action of the spring 39, allowing the die carrier 28 to assume its normal position, as shown in Figures 1, 2, and 9. Thus, it will be seen that the board, after having been marked, will be moved out of abutting engagement with the next following board in sufficient time to allow the dies and die carrier to return to their normal positions before the next following board reaches the dies. (See Figure 2.) During the return movement of the carrier 28 from the position shown in Figure 4 to that shown in Figure 5, the inking roll will be returned to the position shown in Figure 5, and as soon as the carrier 28 returns to its normal position shown in Figure 2, the die holder will be returned to its normal position because of the pinions 55 and rack bars 52.

In machines for grade marking lumber, it is desirable that the marking means be mounted in such a manner that they will automatically adjust themselves to the end of a board which is irregular or has been cut on a slight angle with respect to the longitudinal center line of the board. The die carrier 28 is therefore mounted for horizontal pivotal movement upon the bolt 29. Such pivotal movement of the carrier 28 is limited by means of lugs 63, preferably integrally formed with the carrier 28, and positioned to be engaged by suitable adjusting screws 64, mounted in the lateral extensions 42 of the arm 31. (See Figures 6 and 8.) In Figure 6, it will be noted that the faces of the lugs are spaced a slight distance from the terminals of the screws 64, so that the die carrier may oscillate on the axis of the bolt 29 within certain limits. Because of the slotted connections between the rack bars 52 and the pins 54, such pivotal movement of the carrier 28 will not impart any rotary movement to the die holder 22.

Figures 12 and 13 illustrate a modified form wherein the die holder 22 is rotated with respect to the inking roll 46, by means of friction wheels 64 and friction bars 65. The friction bars 65 are pivotally mounted upon the spaced leg 44 of the channel frame 7, and are yieldably held in frictional engagement with the friction wheels by suitable springs 66, each having one end adjustably connected with its complementary leg 44, as indicated at 67 in Figure 12. When the die holder 22 is thus rotated, it is preferably provided with a semi-annular groove 68, the ends of which are adapted to engage a stop pin 69, preferably depending from the head of the bolt 29, as shown in Figure 13. The groove 68 and stop pin 69 limit the rotation of the die holder 22 so that the dies 23 will always be alined with the approaching board, when the machine is in normal position as illustrated in Figure 12.

Figure 16 illustrates another modified form wherein the channel-shaped frame 7 and the lumber marking mechanism supported thereon, are mounted beneath the traveling board so that instead of the die carrier 28 being moved forwardly and upwardly, when the die is engaged by the board, it is moved forwardly and downwardly. When the apparatus is thus arranged, the tail end of the marked board, after leaving the hold-down guide 71, will be moved upwardly out of abutting engagement with the next following board, thereby allowing the carrier 28 to return to its normal position with the dies 23 in alinement with the next following board, before the latter reaches the position shown in Figure 16. One end of the channel-shaped frame 7 is mounted upon a suitable supporting means indicated at 72, and its other end is supported upon a suitable support 73. All of the marking mechanism mounted upon the channel-shaped frame 7, shown in Figure 16, is substantially identical to the mechanism shown in Figures 2, 4, and 5.

Figure 17 illustrates another modified form wherein the inking roll 46 is mounted between and supported by the spaced legs 44 of the frame 7. When the inking roll is thus positioned, the dies 23 will be moved into marking engagement with the inking roll, when the die carrier 74 is moved in the direction of travel of the lumber as a result of the end of the lumber engaging the dies. In this instance, it will be noted that the inking roll 46 is not movable with the die carrier 74. It is also to be noted that the inking roll is permanently out of the path of the traveling lumber.

I claim as my invention:

1. The combination with a support over which lumber may be moved, of a lumber marking member normally positioned in the path of the traveling lumber and adapted to be engaged thereby, and a cam-device actuable by engagement of the lumber with said marking member, to move the member out of the path of the lumber.

2. The combination with a support over which lumber may be moved, of a lumber marking mechanism including a die having a movable carrier, said die normally positioned in the path of the traveling lumber, and a cam-device associated with said carrier adapted to move it and said die out of the path of the traveling lumber.

3. The combination with a support over which lumber may be moved, of a lumber marking mechanism including a die having a movable carrier, said die and carrier normally positioned in the path of the lumber and adapted to be moved forwardly thereby, a cam-device associated with said carrier and adapted to move the carrier and said die out of the path of the lumber, when moved forwardly thereby, and means for inking said die member.

4. The combination with a support over which lumber may be moved, of a lumber marking mechanism comprising a main frame, an auxiliary frame slidably mounted in said main frame, a plurality of dies, a carrier for said dies movably connected with said auxiliary frame and normally positioned with the dies in the path of the traveling lumber, whereby said dies and said carrier will be moved forwardly when said dies are engaged by the lumber, and a cam-device associated with said carrier for moving said carrier and dies out of the path of the lumber, after a predetermined travel of said carrier.

5. The combination with a support over which lumber may be moved, of a lumber marking mechanism comprising a relatively fixed main frame, an auxiliary frame slidably mounted in said main frame, means adapted yieldably to retain said auxiliary frame in normal position, an arm pivotally mounted on said auxiliary frame, a die having a carrier connected with said arm, yieldable means constantly urging said arm in a direction to retain the die in the path of the moving lumber, whereby the latter will be engaged by the lumber and moved forwardly thereby, and cams on said main frame adapted to be engaged by said arm to positively move the die and its carrier out of the path of the traveling lumber when the die and its carrier are being moved forwardly by the lumber.

6. The combination with a support over which pieces of lumber may be successively moved in abutting relation, of a lumber marking mechanism comprising a suitable die, a movable carrier therefor, said die and its carrier normally being positioned in the path of the traveling lumber whereby said die may be engaged by one end of a piece of lumber, a cam mechanism for moving said die and its carrier out of the path of the lumber to permit uninterrupted movement thereof, said die carrier being adapted to engage one side of the board and to exert a pressure thereagainst whereby, when the tail end of the marked piece of lumber approaches the die carrier, the latter will force the marked lumber out of engagement with the next following piece to permit the die to return to its normal position and be engaged by the next following board.

7. A lumber marking device comprising means over which pieces of lumber may be fed longitudinally, a die carrier and die therefor normally in the path of the lumber adapted to engage a vertical surface thereof, said carrier having a limited horizontal movement through pressure of the moving lumber thereon, and non-swingable means for guiding said carrier and die in a direction diagonally to the moving lumber, and out of the path of the same.

8. A lumber marking device comprising means over which pieces of lumber may be fed longitudinally, a die carrier and die therefor normally in the path of the lumber adapted to engage a vertical surface thereof, said carrier having a limited horizontal movement through pressure of the moving lumber thereon, means for guiding said carrier and die in a direction diagonally to the moving lumber, and out of the path of the same, and means for shifting the position of said die in said carrier during such diagonal movement.

9. A lumber marking device comprising means over which pieces of lumber may be fed endwise, a die carrier and die therefor mounted in the path of the moving lumber, said carrier having a limited horizontal movement through impact of the lumber with its die, guides projecting diagonally with respect to the moving lumber, and means whereby said die carrier will be moved on said guides out of the path of the moving lumber.

10. A lumber marking device comprising means over which pieces of lumber may be fed longitudinally, a carrier and die in the path of the moving lumber, said carrier having a limited movement horizontally through impact of the lumber therewith, cam and guides diagonally arranged with respect to the moving lumber for directing said carrier and die out of the path of the lumber.

11. A lumber marking device comprising means over which pieces of lumber may be fed longitudinally, a carrier having a die normally positioned in the path of the moving lumber, a pivoted arm for supporting said carrier, cam guides associated with said die carrier for moving the carrier and die out of the path of the lumber when engaged thereby, and means on said carrier for inking said die each time the carrier is actuated by the lumber.

12. The combination with means over which pieces of lumber may be moved longitudinally, of a lumber marking device comprising a die carrier having a die normally positioned in the path of the moving lumber, cam guides diagonally arranged with respect to the moving lumber for directing said carrier and die out of the path of the lumber, a die-inking member mounted on said carrier, and a rack and pinion mechanism for relatively rotating said die in said carrier to move it into inking engagement with said inking member, after the die has been engaged by the moving lumber and is moved out of the path thereof by said cam guides.

13. The combination with means over which pieces of lumber may be fed longitudinally, of a carrier having a die normally positioned in the path of the moving lumber, cam guides diagonally arranged with respect to the moving lumber for directing said carrier and die out of the path of the lumber, an inking roll mounted on said carrier, rack bars and pinions operatively connected with said die, each rack bar having one end connected with said cam guides, said connections permitting a limited sliding movement of the rack bars with respect to said cam guides, and said rack and pinions operating to rotate said die to move it into inking engagement with said inking device, when said die carrier is moved forwardly through impact of the lumber with the die.

14. The combination with means over which pieces of lumber may be moved longitudinally, of a lumber marking device comprising a relatively fixed frame, an auxiliary frame slidably mounted therein, a pivoted arm on said auxiliary frame, a die carrier mounted on said frame and having a die thereon, tension means associated with said frame for normally holding said carrier and die in the path of the moving lumber, and cam guides diagonally arranged with respect to the moving lumber for directing said carrier and die out of the path of the lumber when engaged thereby, said die carrier contacting with the side face of the lumber following such diagonal movement, and said tension means being adapted to force the marked piece of lumber out of abutting engagement with the next following piece.

15. The combination with means over which pieces of lumber may be moved longitudinally, of a lumber marking device comprising a relatively fixed main frame, an auxiliary frame slidably mounted therein and yieldingly retained at one end of its movement, a pivoted arm on said auxiliary frame, a carrier supported on said arm and having a die thereon, tension means associated with said auxiliary frame and said pivoted arm for normally holding the carrier and die in the path of the moving lumber, cam guides diagonally arranged with respect to the moving lumber for directing the carrier and die out of the path of the lumber when said die carrier is moved forwardly thereby, said die carrier engaging a horizontal surface of the moving lumber after such forward movement, said tension means causing said carrier to exert transverse upon the moving lumber to force it out of abutting engagement with the next following piece and permit the die carrier and die member to be positioned for engagement with such piece.

16. A lumber marking device comprising in combination, a support for moving lumber, a marking device located in the path of the moving lumber, and a cam device over which the marking device travels and by which it is moved out of the path of the lumber.

In witness whereof I have hereunto set my hand this 24th day of March, 1928.

JOSEPH G. McDONOUGH.